US012608728B2

(12) United States Patent
Wilson et al.

(10) Patent No.: US 12,608,728 B2
(45) Date of Patent: Apr. 21, 2026

(54) FACILITATING DETECTION OF BID DATA MISUSE

(71) Applicant: OATH INC., Dulles, VA (US)

(72) Inventors: Jeff Wilson, Ashburn, VA (US); David Savage, Arlington, VA (US)

(73) Assignee: Yahoo Ad Tech LLC, New York, NY (US)

( * ) Notice: Subject to any disclaimer, the term of this patent is extended or adjusted under 35 U.S.C. 154(b) by 660 days.

(21) Appl. No.: 15/227,793

(22) Filed: Aug. 3, 2016

(65) Prior Publication Data

US 2018/0040031 A1      Feb. 8, 2018

(51) Int. Cl.
G06Q 30/0273      (2023.01)
G06Q 30/0251      (2023.01)

(52) U.S. Cl.
CPC ..... G06Q 30/0275 (2013.01); G06Q 30/0269 (2013.01)

(58) Field of Classification Search
CPC ........................ G06Q 30/0275; G06Q 30/0248
See application file for complete search history.

(56) References Cited

U.S. PATENT DOCUMENTS

| | | | | | |
|---|---|---|---|---|---|
| 8,799,081 | B1 * | 8/2014 | Koran | ................ | G06Q 30/0275 705/14.71 |
| 2014/0046777 | A1 * | 2/2014 | Markey | .............. | G06Q 30/0275 705/14.66 |

| | | | | | |
|---|---|---|---|---|---|
| 2014/0095297 | A1 * | 4/2014 | O'Reilly | ............ | G06Q 30/0246 705/14.45 |
| 2014/0304067 | A1 * | 10/2014 | Bax | ..................... | G06Q 30/0275 705/14.47 |
| 2015/0235275 | A1 * | 8/2015 | Shah | .................. | G06Q 30/0269 705/14.66 |
| 2017/0024776 | A1 * | 1/2017 | Koran | ................ | G06Q 30/0275 |
| 2018/0293387 | A1 * | 10/2018 | Bar-El | .................... | H04L 63/14 |

OTHER PUBLICATIONS

OpenRTB API Specification Version 2.4 (2016); retrieved via https://web.archive.org/web/20160417140022/http://www.iab.com/wp-content/uploads/2016/01/OpenRTB-API-Specification-Version-2-4-DRAFT.pdf (Year: 2016).*

* cited by examiner

*Primary Examiner* — Michael J Sittner
(74) *Attorney, Agent, or Firm* — Cooper Legal Group LLC

(57)      ABSTRACT

Embodiments of the present invention are directed to detecting misuse of contextual data, such as user data. In accordance with some embodiments of the present invention, artificial contextual data is created for artificial users and is, thereafter, provided to a bidder(s). Based on reception of artificial contextual data, bidders can place bids for presentation of advertisements. Bids placed by bidders receiving such artificial context data can be collected and analyzed. When bids appear to be atypically increased or decreased based on the artificial contextual data, a determination can be made that the bidder retains and/or misuses contextual data, such as user data.

20 Claims, 5 Drawing Sheets

100

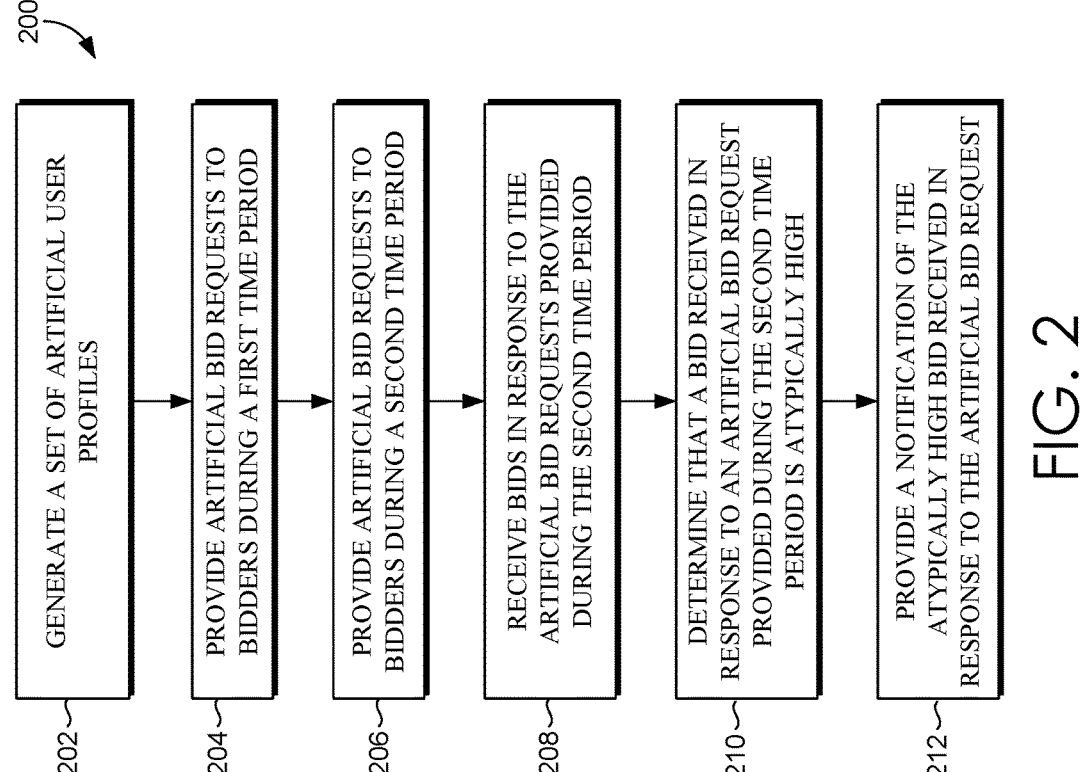

200

202 — GENERATE A SET OF ARTIFICIAL USER PROFILES

204 — PROVIDE ARTIFICIAL BID REQUESTS TO BIDDERS DURING A FIRST TIME PERIOD

206 — PROVIDE ARTIFICIAL BID REQUESTS TO BIDDERS DURING A SECOND TIME PERIOD

208 — RECEIVE BIDS IN RESPONSE TO THE ARTIFICIAL BID REQUESTS PROVIDED DURING THE SECOND TIME PERIOD

210 — DETERMINE THAT A BID RECEIVED IN RESPONSE TO AN ARTIFICIAL BID REQUEST PROVIDED DURING THE SECOND TIME PERIOD IS ATYPICALLY HIGH

212 — PROVIDE A NOTIFICATION OF THE ATYPICALLY HIGH BID RECEIVED IN RESPONSE TO THE ARTIFICIAL BID REQUEST

FIG. 2

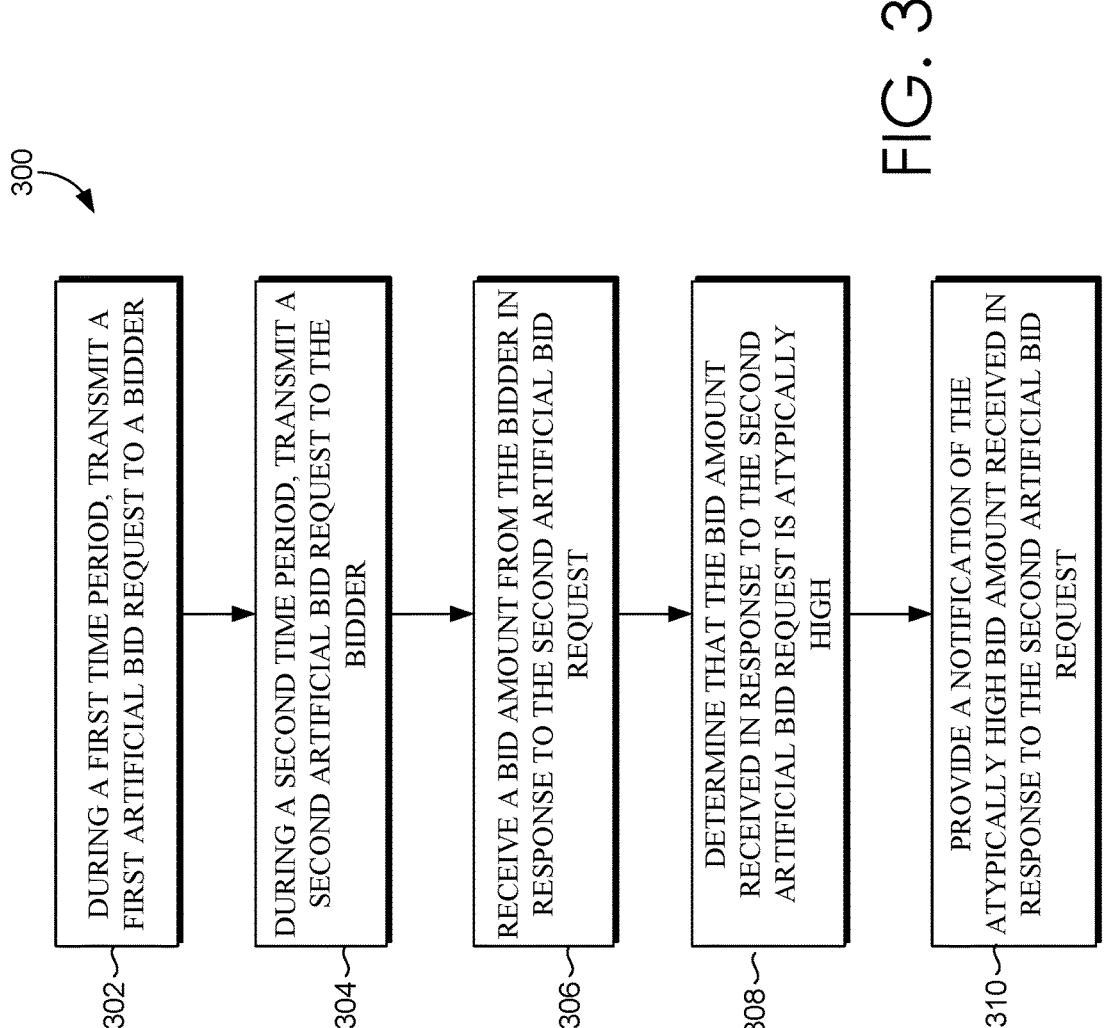

300

302 — DURING A FIRST TIME PERIOD, TRANSMIT A FIRST ARTIFICIAL BID REQUEST TO A BIDDER

304 — DURING A SECOND TIME PERIOD, TRANSMIT A SECOND ARTIFICIAL BID REQUEST TO THE BIDDER

306 — RECEIVE A BID AMOUNT FROM THE BIDDER IN RESPONSE TO THE SECOND ARTIFICIAL BID REQUEST

308 — DETERMINE THAT THE BID AMOUNT RECEIVED IN RESPONSE TO THE SECOND ARTIFICIAL BID REQUEST IS ATYPICALLY HIGH

310 — PROVIDE A NOTIFICATION OF THE ATYPICALLY HIGH BID AMOUNT RECEIVED IN RESPONSE TO THE SECOND ARTIFICIAL BID REQUEST

FIG. 3

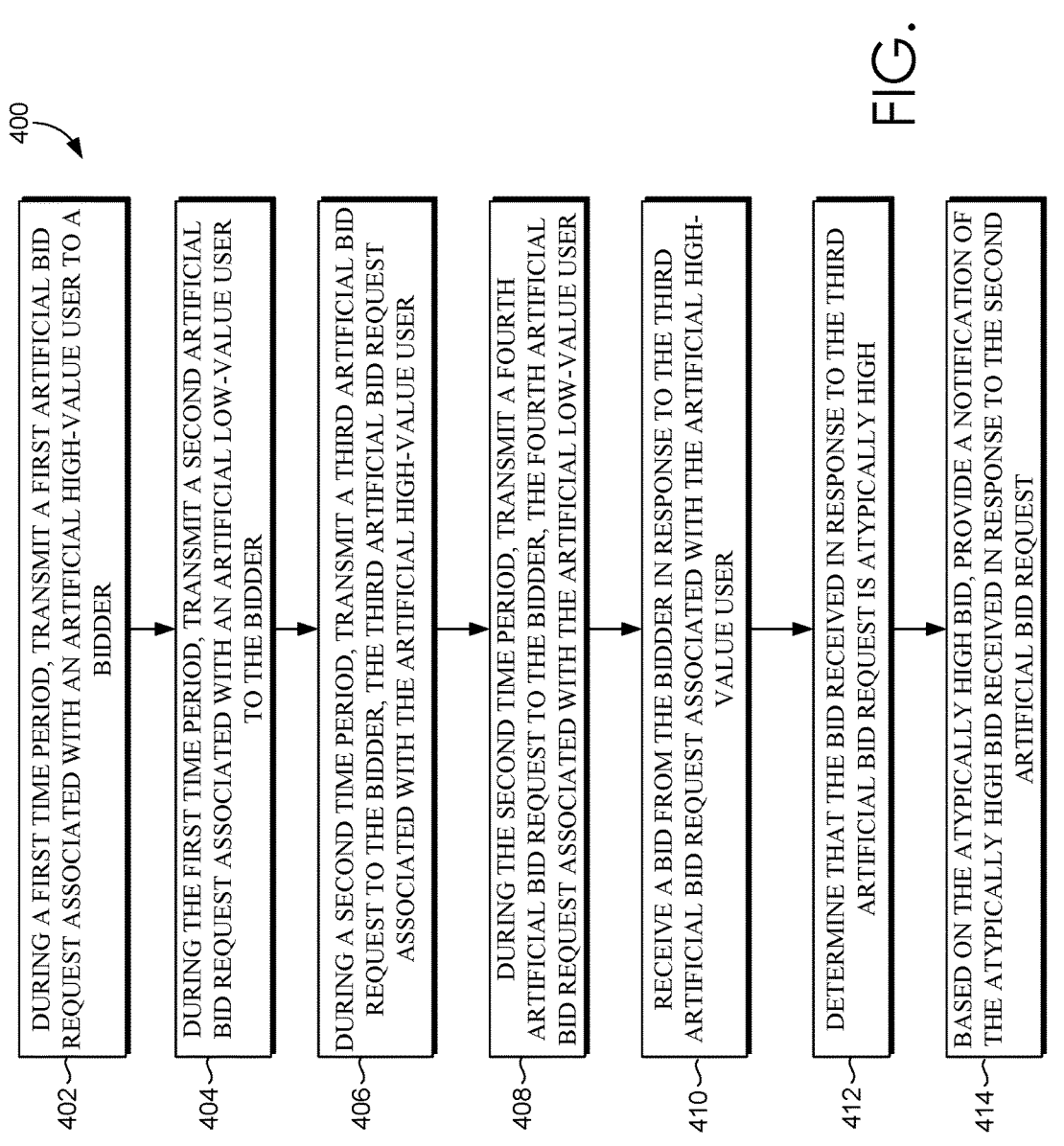

400

402 DURING A FIRST TIME PERIOD, TRANSMIT A FIRST ARTIFICIAL BID REQUEST ASSOCIATED WITH AN ARTIFICIAL HIGH-VALUE USER TO A BIDDER

404 DURING THE FIRST TIME PERIOD, TRANSMIT A SECOND ARTIFICIAL BID REQUEST ASSOCIATED WITH AN ARTIFICIAL LOW-VALUE USER TO THE BIDDER

406 DURING A SECOND TIME PERIOD, TRANSMIT A THIRD ARTIFICIAL BID REQUEST TO THE BIDDER, THE THIRD ARTIFICIAL BID REQUEST ASSOCIATED WITH THE ARTIFICIAL HIGH-VALUE USER

408 DURING THE SECOND TIME PERIOD, TRANSMIT A FOURTH ARTIFICIAL BID REQUEST TO THE BIDDER, THE FOURTH ARTIFICIAL BID REQUEST ASSOCIATED WITH THE ARTIFICIAL LOW-VALUE USER

410 RECEIVE A BID FROM THE BIDDER IN RESPONSE TO THE THIRD ARTIFICIAL BID REQUEST ASSOCIATED WITH THE ARTIFICIAL HIGH-VALUE USER

412 DETERMINE THAT THE BID RECEIVED IN RESPONSE TO THE THIRD ARTIFICIAL BID REQUEST IS ATYPICALLY HIGH

414 BASED ON THE ATYPICALLY HIGH BID, PROVIDE A NOTIFICATION OF THE ATYPICALLY HIGH BID RECEIVED IN RESPONSE TO THE SECOND ARTIFICIAL BID REQUEST

FIG. 4

FACILITATING DETECTION OF BID DATA MISUSE

BACKGROUND

During real-time bidding, advertising space buyers (e.g., advertisers, marketers, etc.) generally receive detailed user information such that a determination can be made as to whether, and to what extent, to place to a bid for ad placement. In particular, as a user navigates to a webpage or navigates within an application, user data is provided to buyers to enable the buyers to place bids for placement of their ad within the webpage or application. Real-time bidding enables numerous buyers to receive real-time feeds of detailed user data each day. Such information typically should not be retained by buyers for secondary uses or purposes pursuant to buyers' contractual terms. Some buyers, however, engage in prohibited reuse of the user data resulting in privacy issues, among other things.

BRIEF DESCRIPTION OF THE DRAWINGS

The present invention is described in detail below with reference to the attached drawing figures, wherein:

FIG. 2 is a flow diagram showing a method of facilitating detection of bid data misuse, in accordance with embodiments of the present disclosure;

FIG. 3 is a flow diagram showing another method of facilitating detection of bid data misuse, in accordance with embodiments of the present disclosure;

FIG. 4 is a flow diagram showing another method of facilitating detection of bid data misuse, in accordance with embodiments of the present disclosure.

DETAILED DESCRIPTION

Figure 1:
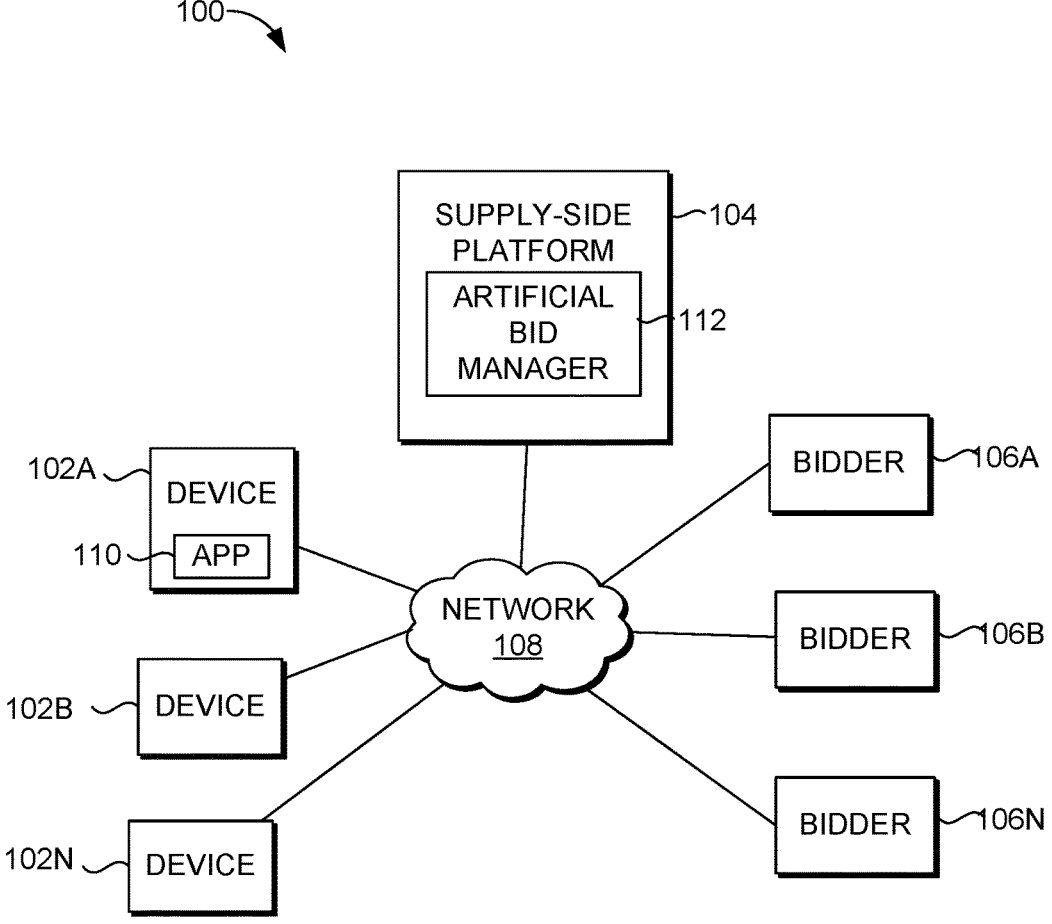
FIG. 1 is a block diagram of an exemplary system for facilitating detection of bid data misuse, in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Targeting an online advertisement(s) for a particular user increases the likelihood that the user will click-on or convert the advertisement(s). As such, generally, when a user requests content, such as a website or application, bid data is provided to advertisement bidders such that an advertisement targeted for the user can be provided along with the requested content for display to the user. To this end, bid data, such as contextual data (e.g., what the user is doing, such as playing a game, reading an article, searching for airfares, etc.) and data about the user (e.g., age, gender, location), may be provided to a bidding entity to allow the bidding entity to determine to what extent to place a bid for presenting an advertisement. For instance, a bidder may receive bid data and use such data to determine whether to place a bid to present an ad to a particular user. If the bidder wins the auction, the bidder has an opportunity to render a desired advertisement to the user.

As multiple bidders participate in the ad bidding process, bid data can be provided to numerous bidders. Such bid data provided to bidders is generally intended to have limited use by the bidders. In particular, the bid data is generally intended for use in placing a bid in response to a particular bid request associated with the bid data. In this regard, pursuant to contractual agreements, the bidder is typically required to discard the bid data, or portion thereof (e.g., user data), irrespective of whether a bid was placed in association with the received bid data. Unfortunately, however, some entities retain the bid data, including user data. More specifically, an entity may accumulate data about a user from bid requests provided over time. While some uses of expired bid data are generally permitted by agreement (e.g., general reporting, bid pricing calibration, etc.), the accumulation of data to build user profiles for future reference, reselling, linking, or user modeling, however, is generally prohibited in accordance with agreements in place.

Accordingly, embodiments of the present invention are directed to facilitating detection of inappropriate or unapproved collection and/or misuse of bid data (e.g., user data). In particular, when an entity inappropriately retains and uses bid data provided in association with a bid request, implementations described herein enable detection of the inappropriate retention and utilization of the data for various purposes outside the scope of the agreement (e.g., informing subsequent bids for that user, data brokering, etc.). In implementation, to detect inappropriate retention and utilization of bid data, artificial bid requests are created for artificial users and are, thereafter, provided to a bidder(s) potentially misusing data. Based on reception of artificial bid request data, bidders can place bids for presentation of advertisements to artificial users. Bids placed by bidders receiving such artificial bid data can be collected and analyzed. When an entity's bid prices appear to be atypically increased or decreased based on the artificial bid data, a determination can be made that the bidder retains and/or misuses bid data, such as user data. Detecting misuse of bid data, such as user data, can assist with protecting publisher data, user privacy, and integrity of the real-time bidding process as well as ensuring fair competition between bidders.

By way of example only, assume that artificial bid requests including artificial bid data are provided to a bidder to portray artificial high-value users and artificial low-value users for a period of time, such as 30 days. Now assume that, at a later time, artificial bid requests without bid data are provided to the bidder in association with artificial unique identifiers corresponding with the high-value users and low-value users. Typically, if the bidder has not retained any specific bid data associated with the users, the bidder would place a bid that is about the same value for both artificial high-value users and low-value users. If it is detected, however, that the bidder places higher bids in association with artificial high-value users, it can be determined that the bidder has improperly retained the specific bid data to facilitate bid placement. To further confirm misuse of bid data, bids can be collected in association with multiple artificial bid requests to aggregate atypical bid placement.

Turning now to FIG. 1, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of devices, such as devices 102*a* and 102*b* through 102*n*, a supply-side platform 104, a number of bidders 106, such as bidders 106*a* and 106*b* through 106*n*, and a network 108 (often referred to as an exchange). It should be understood that operating environment 100 shown in FIG. 1 is an example of one suitable operating environment. Each of the components shown in FIG. 1 may be implemented via any type of computing device, such as one or more of computing device 500, described in connection to FIG. 5, for example. These components may communicate with each other via network 108, which may be wired, wireless, or both. Network 108 can include multiple networks, or a network of networks, but is shown in simple form so as not to obscure aspects of the present disclosure. By way of example, network 108 can include one or more wide area networks (WANs), one or more local area networks (LANs), one or more public networks, such as the Internet, and/or one or more private networks. Where network 108 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 108 is not described in significant detail.

It should be understood that any number of devices, supply-side platforms, and bidders may be employed within operating environment 100 within the scope of the present disclosure. Each may comprise a single device or multiple devices cooperating in a distributed environment. For instance, supply-side platform 104 may be provided via multiple devices arranged in a distributed environment that collectively provide the functionality described herein. Additionally, other components not shown may also be included within the distributed environment.

At a high level, supply-side platform 104 can collect bid data provided from devices. Bid data may include, for instance, contextual data; data associated with a user, a user device, a content request, etc.; or the like. The supply-side platform 104 can utilize the bid data, or a portion thereof, to generate artificial bid requests that include artificial bid data, such as an artificial user or device identifier. Such artificial bid requests are provided to one or more bidders, such as bidders 106. Bids placed by the bidders 106 in response to the artificial bid requests are collected by the supply-side platform 104 and, thereafter, analyzed. In particular, the supply-side platform 104 can analyze whether the bid responses placed in response to the artificial bid requests appear to be atypical given the artificial bid data provided to the bidder. For instance, an artificial bid request that simply includes a user or device identifier, but results in an atypically high bid amount, can be recognized. Based on the increased bid amount, an alert or notification can be provided to indicate that the particular bidder may be misusing bid data, such as user data. For example, a notification regarding potential data misuse may be provided to an entity associated with the supply-side platform 104.

Turning initially to devices, devices 102*a* through 102*n* can be client or user devices on a client-side of operating environment 100. Supply-side platform 104 can comprise server-side software designed to work in conjunction with client-side software on devices 102*a* through 102*n* so as to implement any combination of the features and functionalities discussed in the present disclosure. An example of such client-side software is application 110, or portion thereof, on device 102*a*. Each other device includes a similar application, with similar functionality. This division of operating environment 100 is provided to illustrate one example of a suitable environment, and it is noted there is no requirement for the components illustrated in operating environment 100 to remain as separate entities.

Devices 102*a* through 102*n* can be any type of computing device capable of rendering advertisements. For example, in some implementations, devices 102*a* through 102*n* are the type of computing devices described in relation to FIG. 5 herein. By way of example and not limitation, a device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, a digital billboard, any combination of these delineated devices, or any other suitable device.

The devices can include one or more processors, and one or more computer-readable media. The computer-readable media may include computer-readable instructions executable by the one or more processors. The instructions may be embodied by one or more applications, such as application 110 shown in FIG. 1. As indicated above, the other devices can include one or more applications similar to application 110. The application(s) may generally be any application capable of facilitating the exchange of information between the device and a supply-side platform(s) and/or bidder(s). In some implementations, the application(s) comprises a web application, which can run in a web browser, or similar device, which may contain both client and server-side components. In addition, or instead, the application(s) can comprise a dedicated application. In some cases, the application is integrated into the operating system (e.g., as a service).

A user can indirectly provide or initiate input to the supply-side platform 104 using application 110. The input may be provided by the user via a user interface associated with application 110, which can be client or server based (e.g., browser based). Typically, a user initiates a request for content (content request). For example, a user might initiate a request for a webpage, website, or application. A content request may be initiated via user input into an application or web browser (e.g., input a URL, or selection of a link).

In accordance with one embodiment, a content request includes or is associated with bid data. In this regard, bid data can be sent along with, in association with, or in response to a content request. Bid data refers to any data that can be used to analyze for placing a bid, including data about the end user or users (e.g., device ids, cookie ids, or similar identifiers) and contextual data. For instance, bid data may provide an indication of a user device, a user, a content request, etc. User device data includes, but is not limited to, a type of user device, a geographical location of the user device, features or attributes of the user device, a device identifier, etc. User data often includes, for instance, a user identifier, a user demographic, a user preference, etc. Content request data includes, by way of example, a website or application for which content is desired, a time at which content is requested, etc. In some cases, the application 110 can facilitate collecting and providing bid data to the supply-side platform 104. As one example, supply-side platform code can be invoked in the application 110 to collect data, such as device location, and provide the data to the supply-side platform 104.

In response to the request for content, content can be received at the device. Content received at the device in response to a content request can be facilitated from the supply-side platform 104 or other component, for example. As described, the content can be in the form of a webpage or application containing advertisements. An advertisement refers to any online advertisement (e.g., banner ads, pop-ups, etc.) presented in an online environment, e.g., via a webpage or application. As bid data can be provided in association with the content request, the received advertisement may be contextually relevant to the user. For instance, because user data, device data, and/or content request data is provided to bidders, an advertisement presented for display may be more relevant to the user increasing the likelihood that the user will click on or convert the advertisement. The application 110 can receive the content and associated advertisement(s) and, thereafter, present the content and advertisement(s) to the user via a display screen of the device.

Turning to the supply-side platform 104, the supply-side platform generally generates and/or provides bid requests. A bid request, as used herein, refers to a request for an advertisement bid to be placed such that an advertisement can be presented within content (e.g., a webpage or application content). For example, a bid request can request bids for placement of an advertisement via a real-time bidding system.

Supply-side platform 104 can refer to any component(s), device(s), or server(s) capable of providing bid requests. Generally, a supply-side platform enables web publishers (website and application owners) to manage advertising space. In some cases, a web publisher manages or controls the supply-side platform. In other cases, a web publisher utilizes the supply-side platform to manage advertising space. Although not illustrated, a supply-side platform generally interfaces with advertising exchanges (or ad exchanges). An ad exchange facilitates the buying and selling of advertising inventory, for instance, from multiple ad networks or demand-side entities. By way of example, many ad exchanges utilize real-time bidding to obtain bids for ad placement. When a bid is selected, the buyer's ad can be displayed on the publisher's webpage or application via the device. Although the supply-side platform is illustrated as an independent platform, as can be appreciated, a supply-side platform, or technologies associated therewith, can be implemented via an ad exchange, a user device, portions thereof, or the like. For instance, application 110 of device 102A may collect bid data and provide a bid request directly to bidders 106.

The supply-side platform 104 can initiate a bid request upon obtaining a content request and/or bid data. By way of example, a content request and/or bid data can be provided by a device, such as device 102a, to the supply-side platform 104. Upon receiving the content request and/or bid data, the supply-side platform 104 can generate a bid request for communicating to one or more bidders, such as bidders 106a-106n. Upon obtaining bids for ad placement, the supply-side platform 104 can provide advertisements to the device for display.

As shown in FIG. 1, the supply-side platform 104 can include an artificial bid manager 112. An artificial bid manager enables detection of data misuse by bidders, such as bidders 106a-106n. At a high-level, the artificial bid manager 112 generates artificial bid requests and collects bid responses placed in connection with the artificial bid requests. Such artificial bid data can then be analyzed to determine whether a bidder is misusing data.

Initially, the artificial bid manager 112 may generate artificial bid data, such as artificial user identifiers and/or other artificial contextual data. In some cases, artificial bid data can be modeled or generated based on collected bid data. In this regard, bid data received at the supply-side platform 104 from user devices can be collected. Thereafter, received bid data can be associated with an artificial user identifier or artificial device identifier (artificial unique identifier) to generate artificial bid data. As such, bid data associated with legitimate users can be used to generate similar artificial bid data. In such cases, even though the artificial bid data is similar to bid data associated with a legitimate user, to bidders the artificial bid data would appear as new based on the artificial unique identifier. Generating artificial bid data can occur in any manner and is not intended to be limited herein. Further, artificial bid data can be stored in any manner, such as artificial user profiles.

The artificial bid manager 112 can provide artificial bid requests including or associated with the artificial bid data. In embodiments, artificial bid requests refer to bid requests that are associated with artificial bid data, such as an artificial unique identifier (e.g., user identifier or device identifier). In some cases, an artificial bid request may include only an artificial unique identifier (and a minimum amount of required information). In other cases, an artificial bid request may include additional detailed artificial bid or contextual information, such as geographical location, demographic information, target website or application into which the advertisement is to be placed, etc.

Artificial bid requests can be provided for any number and type of artificial users. For instance, artificial bid requests can be provided for both high-value users and low-value users. High-value users may refer to users that are considered more likely to click on or convert an advertisement (known to result in high bid prices), while low-value users may refer to users that are considered less likely to click on or convert an advertisement (known to result in low bid prices). Various user types (e.g., high and low value users) can be used to obtain a baseline of bid prices for different types of users. For instance, some campaigns are primarily exposure based campaigns that focus on brand awareness to certain consumers (e.g., affluent users). In such a case, a high-value artificial user may be modeled after the desired audience.

Artificial bid requests can be communicated to a bidder(s), such as bidders 106a-106n (e.g., one, many, or all). The supply-side platform 104 can provide artificial bid requests directly or indirectly (e.g., via an ad exchange) to bidders. Artificial bid requests can be initiated and communicated at any time. For instance, artificial bid requests can be periodically provided. As can be appreciated, artificial bid requests may be indistinguishable from legitimate bid requests received at bidders.

In accordance with embodiments described herein, the artificial bid manager 112 can provide artificial bid requests for an accumulation time period to allow the bidder(s) to accumulate bid data prior to analyzing whether any data misuse is occurring. To this end, artificial bid requests with bid data, such as rich bid data, may be provided for an accumulation time period. An accumulation time period can be any length of time during which artificial bid requests are provided to allow misusing bidders to accumulate bid data. For instance, artificial bid requests can be provided with rich bid data to bidders for 7 days. Likewise, statistics regarding bid behavior might be collected for given long periods of time to establish baseline behavior (e.g., average bids for certain types of users, etc.). In some cases, bids placed by bidders in response to artificial bid requests may be captured during the accumulation time period. In other cases, bids placed by bidders in response to artificial bid requests might not be captured during the accumulation time period.

During an analysis time period, bids placed in response to artificial bid requests can be collected and analyzed for bid data misuse. An analysis time period refers to a period of time during which bid responses are analyzed to identify potential bid data misuse. Generally, bids that appear atypical given a particular artificial bid request can be deemed or identified as a potential bid data misuse. For example, as the user or device identifier is artificial, a bidder should not have external bid data associated with the user or device identifier that might drive a high bid price. Accordingly, any bid being placed in association with an artificial identifier should not be higher, or lower, than another user identifier not associated with bid data. For instance, a bid request associated with an artificial identifier would typically result in a bid amount as if associated with a low value user, as the user should not exist to the bidding entity outside the immediate bid context.

In embodiments, artificial bid requests provided during an analysis time period may include no bid data other than a unique identifier (e.g., a user identifier or a device identifier) or may include limited bid data. For instance, artificial bid requests for artificial high-value users and artificial low-value users may include a unique identifier, an indication of a desired or target webpage, and an indication of a geographical location. Limited bid data may be provided, for instance, in an effort to ensure that a bid is not being placed in response to rich bid data.

In other embodiments, artificial bid data provided in association with an artificial bid request may be similar or the same across previously provided artificial high-value and low-value users. In this regard, artificial bid requests that are identical or similar for both artificial low and high value users can be sent. For instance, artificial bid data, other than a unique identifier, can be normalized between artificial high and low value users in such a way that should statistically produce the same bid prices/results. By way of example only, assume that artificial bids are communicated during an accumulation time period. Further assume that the artificial bids include artificial bid data for an artificial high value user and an artificial low value user. During the analysis time period, the artificial bid data provided for the artificial high value user can be the same or similar to the bid data provided for the artificial low value user. As can be appreciated, while the artificial bid data is generally the same or similar, the artificial bid requests generally include unique identifiers to distinguish the artificial users (e.g., an artificial user identifier or an artificial device identifier).

Upon providing artificial bid data to bidders, one or more bidders, such as bidders 106, can receive the artificial bid data and utilize the artificial bid data to determine whether, and to what extent, to place a bid for advertisement placement. A bidder, such as bidders 106 can refer to any component(s), device(s), or server(s) capable of providing bids in response to bid requests (e.g., artificial bid requests). In some cases, a bidder can be implemented via a demand-side platform, or portion thereof. Generally, a demand-side platform enables buyers or purchasers of digital advertising inventory to place bids for ad placement. A demand-side platform may manage multiple ad exchanges. Buyers may include, for instance, marketers, advertisers, etc. Using a demand-side platform, buyers can manage bids for ad placement to target users. When a placed bid is selected, the buyer's ad can be displayed on the publisher's webpage or application via the device.

As described, in some cases, a bidder may elect to inappropriately use previously received artificial bid data. Misuse of the previously received artificial bid data can be detected in any number of ways. Detecting misuse of bid data generally includes a comparison of bids placed by a bidder. By comparing bids placed by a bidder, a determination can be made as to whether bid data received by the bidder is misused. In particular, bid amounts placed for various artificial bid requests can be analyzed and determined to be atypical when the bid placed is not as expected based on the artificial bid data provided along with the artificial bid request.

As such, bids placed by bidders 106 in response to artificial bid requests are obtained by the supply-side platform 104. The bids can be analyzed to determine or indicate any misuse of artificial bid data previously provided to the bidder. When a bid placed by a bidder is deemed atypically high, or low, given the artificial bid data provided in connection with the artificial bid request, the bid can be designated as a potential misuse of bid data (e.g., user information).

Determining whether a bid placed by a bidder in response to an artificial bid request is atypically high or low can be assessed in any number of manners. In some cases, a bid resulting from an artificial bid request can be compared to other bids placed by the bidder. For example, in an implementation in which artificial bid requests are provided during an analysis time period with limited bid data, if a bidder places a high bid for an artificial bid request associated with an artificial user, it is likely the bidder retained intelligence from prior bid data to increase their interest to bid. The placed bid may be compared to other bids placed in response to bid requests (e.g., artificial bid requests) provided with limited or no bid data. For instance, a placed bid may be compared to a low, average, or high bid previously placed when provided with only a unique identifier of the user or user device. If the placed bid is greater than a threshold amount compared to previous bid(s), the placed bid can be deemed an indication of potential bid data misuse.

As another example, assume that rich bid data is provided to a bidder in association with artificial high value users during an accumulation time period. Further assume that, at a later time, the same unique identifier used to identify the artificial high value user is now provided to the bidder via an artificial bid request with different bid data (e.g., limited bid data, bid data associated with a low value user, etc.). In such a case, if a bidder places a high bid, it is likely the bidder retained intelligence from prior bid data to increase their interest to bid. The placed bid may be compared to other bids placed in response to bid requests (e.g., artificial bid requests) provided with similar or the same bid data (e.g., limited bid data, bid data associated with a low value user, etc.). For instance, a placed bid may be compared to a low, average, or high bid(s) previously placed when provided with the same or similar bid data. If the placed bid is greater than a threshold amount as compared to previous bid(s), the placed bid can be deemed an indication of potential bid data misuse as having the same or similar variables should result in the same bid prices.

As yet another example, assume artificial bid requests are provided to a bidder in association with both high and low value users with different unique identifiers but otherwise having the similar or same bid data. In such a case, if a bidder places a high bid for the artificial bid request associated with the high value user, it is likely the bidder retained intelligence from prior bid data to increase their interest to bid. If a particular bid is greater than a threshold amount as compared to the other bid(s), the particular bid can be deemed an indication of potential bid data misuse as having the same or similar variables should result in the same bid prices.

Detection methods that do not rely on response price can also be used to detect inappropriate retention and misuse. For example, assume artificial bid requests are supplied to a bidder with accompanying data appended to indicate the user has interest in particular subject matter and/or would be a good candidate to respond to certain advertisements (e.g., segments such as "auto intender" or "new car shopper" or lat-long coordinates of a major auto dealership might be appended to bid requests sent to bidders). After a continuous supply of data associated with particular subject matter is sent to bidders in bid requests over time, the supply-side platform could generate a bid request to the bidder containing no information except the unique identifier associated with the previous bid requests. The supply side platform could then declare the bidder the winner and "award" the faux impression to the buyer (regardless of the price the bidder responds with). The supply-side platform can examine the content of the advertisement and determine if it matches the data sent in previous bid requests (e.g., if a buyer responds to an essentially "empty" bid request from the SSP (except unique identifier) with a "Minivan" advertisement after receiving a regular supply "New Minivan Intender" segment data for the given user, it could be discerned that the buyer was inappropriately retaining segment or contextual data associated with previous bids).

As can be appreciated, in some cases, determining or designating misuse of bid data by a bidder can be based on an aggregate of data. For instance, particular bids deemed to indicate a potential misuse of bid data can be aggregated and evaluated. In this regard, a determination of misuse of bid data may be made upon a portion or threshold number of instances in which bids appear to be placed based on previously received bid data.

Upon the supply-side platform 104 determining a potential misuse of bid data, an alert or notification can be provided. To this end, a user of the supply-side platform 104 can be notified of a potential data misuse by a bidder. The notification can include any type or amount of information. For instance, a notification may provide the specific bidder, the number of instances in which potential data misuse was detected, the specific bids placed in connection with the potential data misuse, any baseline bids used to compare with the placed bids, the specific data misused, etc.

The notification or alert can be provided to any number of devices or entities. For instance, in some cases, a notification or alert can be provided to another supply-side platform. By way of example, another supply-side platform may utilize resources of the supply-side platform 104 to detect misuse of data. In such a case, the supply-side platform 104 may provide notifications of potential data misuse to the other supply-side platform.

Referring now to FIG. 2, a flow diagram is provided showing an embodiment of a method 200 for facilitating detection of bid data misuse. Each block of method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 202, a set of artificial user profiles are generated. Generally, the artificial user profiles include an artificial unique identifier and artificial bid data. At block 204, artificial bid requests are provided to bidders during a first time period. In embodiments, the artificial bid requests include an artificial unique identifier and at least a portion of the artificial contextual data for a corresponding artificial user profile. Providing the artificial bid requests during a first time period can enable the bidder to collect data, such as unique identifiers and contextual data included along with the artificial bid requests. At block 206, artificial bid requests are provided to bidders during a second time period, such as an analysis time period. In embodiments, such artificial bid requests include at least the artificial unique identifier for the corresponding artificial user profile. In some cases, the artificial bid requests also include other artificial contextual data. At block 208, bids are received in response to the artificial bid requests provided during the second time period. At block 210, it is determined that a bid received in response to an artificial bid request provided during the second time period is atypically high. Such a determination can be made in any number of ways. For example, the bid can be compared to other bids placed with similar or the same bid information provided in the bid requests. At block 212, a notification of the atypically high bid received in response to the artificial bid request is provided, for example, to an entity.

Referring now to FIG. 3, a flow diagram is provided showing one embodiment of a method 300 for facilitating detection of bid data misuse. Initially, at block 302, during a first time period, a first artificial bid request is transmitted to a bidder. The first artificial bid request includes an artificial unique identifier and artificial contextual data. During a second time period, at block 304, a second artificial bid request is transmitted to the bidder. The second artificial bid request includes the artificial unique identifier and a reduced amount of the artificial contextual data. At block 306, a bid amount is received from the bidder in response to the second artificial bid request. Thereafter, at block 308, it is determined that the bid amount received in response to the second artificial bid request is atypically high. Determining that the bid amount received is atypically high can be performed in any manner. For instance, the bid amount can be compared with other received bid amounts received in response to artificial bid requests that include only artificial unique identifiers, limited artificial contextual data, or similar contextual data. At block 310, a notification of the atypically high bid amount received in response to the second artificial bid request is provided. Such a notification can be provided to an entity of a supply-side platform, for instance.

Referring now to FIG. 4, a flow diagram is provided showing one embodiment of a method 400 for facilitating detection of bid data misuse. Initially, at block 402, during a first time period, a first artificial bid request is transmitted to a bidder, the first artificial bid request including a first artificial unique identifier and first artificial contextual data associated with an artificial high-value user. At block 404, during the first time period, a second artificial bid request is transmitted to the bidder, the second artificial bid request including a second artificial unique identifier and second artificial contextual data associated with an artificial low-value user. Thereafter, at block 406, during a second time period, a third artificial bid request is transmitted to the bidder, the third artificial bid request including the first artificial unique identifier associated with the high-value user. At block 408, a fourth artificial bid request is transmitted to the bidder, the fourth artificial bid request including the second artificial unique identifier associated with the artificial low-value user. A bid from the bidder is received in response to the third artificial bid request associated with the artificial high-value user. This is indicated at block 410. At block 412, it is determined that the bid received in response to the third artificial bid request is atypically high. The bid can be deemed atypically high, for example, based on a comparison with bids placed in association with bid requests corresponding with artificial low-values users. Based on the atypically high bid, a notification of the atypically high bid received in response to the second artificial bid request is provided, as indicated at block 414.

Figure 5:
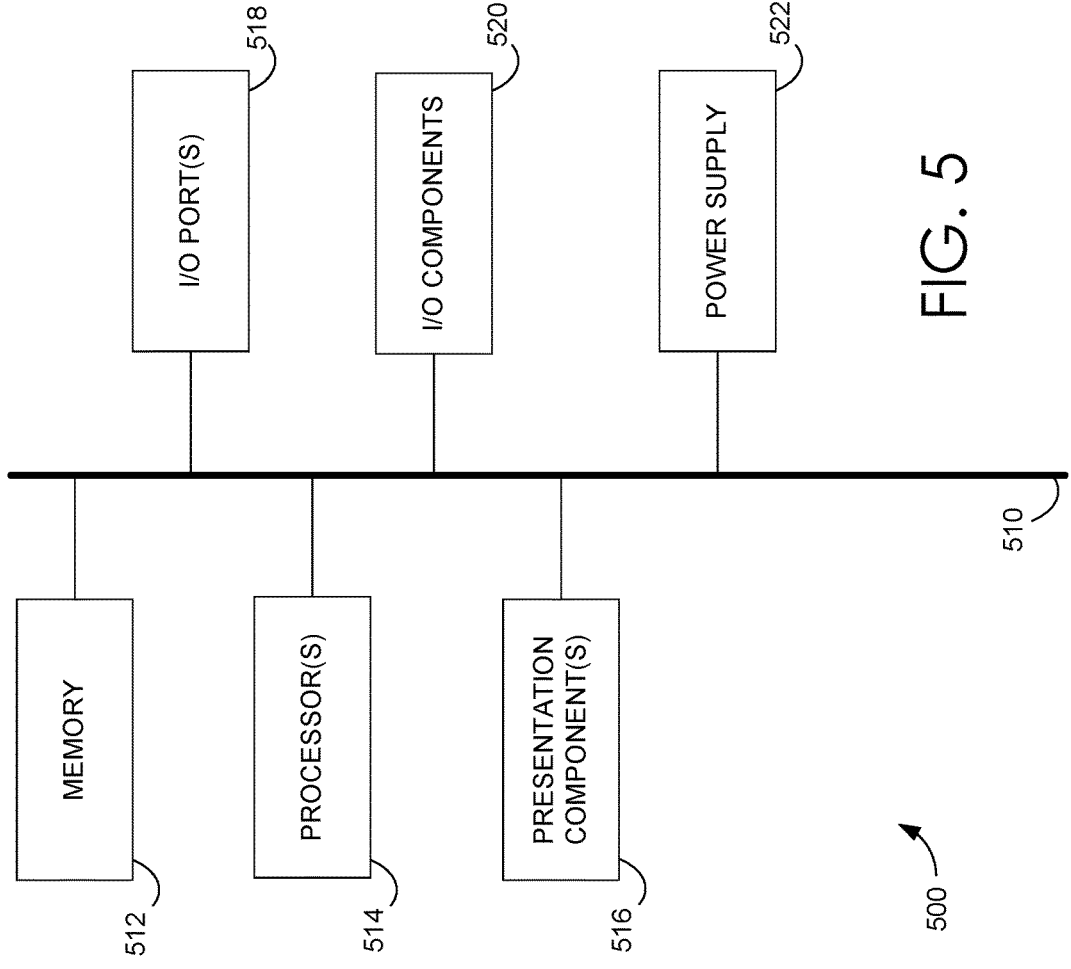
FIG. 5 is a block diagram of an exemplary computing environment suitable for use in implementations of the present disclosure.

Turning now to FIG. 5, FIG. 5 provides a diagram of an exemplary computing environment suitable for use in implementation of the present disclosure. Computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 5 is merely illustrative of an exemplary computing device that can be used in connection with one or more embodiments of the present invention. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 1018 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more non-transitory computer-readable media having a plurality of executable instructions embodied thereon, which, when executed by one or more processors, cause the one or more processors to perform a method comprising:

receiving, from an advertiser, a desired audience for a campaign;

determining to provide artificial bid requests, for the campaign, for different value user types including both (i) a high-value user type associated with a higher likelihood of clicking on or converting an advertisement of the campaign and (ii) a low-value user type associated with a lower likelihood of clicking on or converting an advertisement of the campaign;

modeling an artificial user of the high-value user type based upon the desired audience for the campaign;

modeling a second artificial user of the low-value user type based upon the desired audience for the campaign;

generating, as part of a process for identifying one or more potential misuses of bid data by a bidder and via a processor-implemented supply-side platform, a first artificial user profile for the artificial user of the high-value user type, wherein the first artificial user profile is generated by combining an artificial unique identifier for the artificial user with legitimate contextual data associated with a legitimate user such that artificial bid data of the first artificial user profile appears as new to bidders based upon the artificial unique identifier;

generating, as part of a process for identifying one or more potential misuses of bid data by the bidder and via the processor-implemented supply-side platform, a first artificial bid request requesting bidding for artificial advertisement placement in association with the artificial user, wherein generating the first artificial bid request comprises including, in the first artificial bid request being generated, the artificial unique identifier for the artificial user and the legitimate contextual data associated with the legitimate user, wherein the first artificial bid request is indicative of a level of value associated with the artificial user based upon the legitimate contextual data;

during a first time period, transmitting, as part of the process for identifying one or more potential misuses of bid data by the bidder and via the processor-implemented supply-side platform, the first artificial bid request indicative of the level of value associated with the artificial user to the bidder;

generating, as part of the process for identifying one or more potential misuses of bid data by the bidder and via the processor-implemented supply-side platform, a second artificial bid request requesting bidding for artificial advertisement placement in association with the artificial user, wherein generating the second artificial bid request comprises including, in the second artificial bid request being generated, the artificial unique identifier included in the first artificial bid request, wherein the second artificial bid request is not indicative of the level of value associated with the artificial user;

during a second time period, transmitting, as part of the process for identifying one or more potential misuses of bid data by the bidder and via the processor-implemented supply-side platform, the second artificial bid request not indicative of the level of value associated with the artificial user to the bidder;

receiving a bid amount from the bidder in response to the second artificial bid request;

determining that the bid amount received in response to the second artificial bid request generated to include the artificial unique identifier for the artificial user but is not indicative of the level of value associated with the artificial user exceeds a threshold;

providing a notification of the bid amount exceeding the threshold;

generating, as part of the process for identifying one or more potential misuses of bid data by the bidder and via the processor-implemented supply-side platform, a third artificial unique identifier that was not previously included in any user profile provided to bidders by the processor-implemented supply-side platform;

generating, as part of the process for identifying one or more potential misuses of bid data by the bidder and via the processor-implemented supply-side platform, a fifth artificial bid request requesting bidding for artificial advertisement placement in association with a third artificial user, wherein generating the fifth artificial bid request comprises including, in the fifth artificial bid request being generated, the third artificial unique identifier and segment data indicating that the third artificial user has an interest in at least one of particular subject matter or a particular geographical location;

transmitting, as part of the process for identifying one or more potential misuses of bid data by the bidder and via the processor-implemented supply-side platform, the fifth artificial bid request including the segment data indicating that the third artificial user has an interest in at least one of the particular subject matter or the particular geographical location to the bidder during a fifth time period;

generating, as part of the process for identifying one or more potential misuses of bid data by the bidder and via the processor-implemented supply-side platform, a sixth artificial bid request requesting bidding for artificial advertisement placement in association with the third artificial user, wherein generating the sixth artificial bid request comprises including, in the sixth artificial bid request being generated, the third artificial unique identifier included in the fifth artificial bid request while excluding, from the sixth artificial bid request being generated, at least some of the segment data indicating that the third artificial user has an interest in at least one of the particular subject matter or the particular geographical location;

transmitting, as part of the process for identifying one or more potential misuses of bid data by the bidder and via the processor-implemented supply-side platform, the sixth artificial bid request excluding at least some of the segment data indicating that the third artificial user has an interest in at least one of the particular subject matter or the particular geographical location to the bidder during a sixth time period after the fifth time period;

receiving, via the processor-implemented supply-side platform, one or more third bids in response to the sixth artificial bid request;

declaring, via the processor-implemented supply-side platform, the bidder to be the winner associated with the sixth artificial bid request regardless of one or more prices associated with the one or more third bids; and examining, via the processor-implemented supply-side platform, content of one or more advertisements associated with winning the sixth artificial bid request and determining whether the content of the one or more advertisements matches at least some of the segment data indicating that the third artificial user has an interest in at least one of the particular subject matter or the particular geographical location and included in the fifth artificial bid request.

2. The one or more computer-readable media of claim 1, wherein the second artificial bid request comprises a reduced amount of the legitimate contextual data, wherein determining that the bid amount exceeds the threshold is based upon the bid amount being greater than a second bid amount placed in response to another bid request associated with contextual data similar to the reduced amount of the legitimate contextual data.

3. The one or more computer-readable media of claim 2, wherein the another bid request comprises a third artificial bid request having second legitimate contextual data similar to the reduced amount of the legitimate contextual data.

4. The one or more computer-readable media of claim 1, wherein the second artificial bid request comprises a reduced amount of the legitimate contextual data, wherein the reduced amount of the legitimate contextual data does not comprise some of the legitimate contextual data.

5. The one or more computer-readable media of claim 4, wherein determining that the bid amount exceeds the threshold is based upon the bid amount being greater than a second bid amount placed in response to a third artificial bid request associated with a second artificial unique identifier but not a second legitimate contextual data.

6. The one or more computer-readable media of claim 1, wherein the particular geographical location comprises latitude-longitude coordinates.

7. A computer-implemented system comprising:

one or more processors and memory, coupled with the one or more processors, having executable instructions embodied thereon, which, when executed by the one or more processors cause the one or more processors to perform operations comprising:

receiving, from an advertiser, a desired audience for a campaign;

determining to provide artificial bid requests, for the campaign, for different value user types including both (i) a high-value user type associated with a higher likelihood of clicking on or converting an advertisement of the campaign and (ii) a low-value user type associated with a lower likelihood of clicking on or converting an advertisement of the campaign;

modeling an artificial user of the high-value user type based upon the desired audience for the campaign;

modeling a second artificial user of the low-value user type based upon the desired audience for the campaign;

generating, as part of a process for identifying one or more potential misuses of bid data by a bidder, a first artificial user profile for the artificial user of the high-value user type, wherein the first artificial user profile is generated by combining an artificial unique identifier for the artificial user with legitimate contextual data associated with a legitimate user such that artificial bid data of the first artificial user profile appears as new to bidders based upon the artificial unique identifier, wherein the legitimate contextual data is indicative of one or more actions being performed by the legitimate user at a time of a legitimate bid request associated with the legitimate user;

generating, as part of the process for identifying one or more potential misuses of bid data by the bidder, a first artificial bid request requesting bidding for artificial advertisement placement in association with the artificial user associated with an artificial high value, wherein the first artificial bid request comprises the artificial unique identifier for the artificial user and the legitimate contextual data associated with the legitimate user, wherein the first artificial bid request is indicative of the artificial high value associated with the artificial user based upon the legitimate contextual data;

generating, as part of a process for identifying one or more potential misuses of bid data by the bidder, a second artificial user profile for the second artificial user of the low-value user type, wherein the second artificial user profile is generated by combining a second artificial unique identifier for the second artificial user with second legitimate contextual data associated with a second legitimate user such that second artificial bid data of the second artificial user profile appears as new to bidders based upon the second artificial unique identifier;

generating, as part of the process for identifying one or more potential misuses of bid data by the bidder, a second artificial bid request requesting bidding for artificial advertisement placement in association with the second artificial user associated with an artificial low value, wherein the second artificial bid request comprises the second artificial unique identifier for the second artificial user and the second legitimate contextual data associated with the second legitimate user, wherein the second artificial bid request is indicative of the artificial low value associated with the second artificial user based upon the second legitimate contextual data;

during a first time period, transmitting, as part of the process for identifying one or more potential misuses of bid data by the bidder, the first artificial bid request including the legitimate contextual data for the artificial user to the bidder and transmitting the second artificial bid request including the second legitimate contextual data for the second artificial user to the bidder;

generating, as part of the process for identifying one or more potential misuses of bid data by the bidder, a third artificial bid request requesting bidding for artificial advertisement placement in association with the artificial user associated with the artificial high value, wherein the third artificial bid request comprises the artificial unique identifier for the artificial user included in the first artificial bid request but does not comprise at least some of the legitimate contextual data included in the first artificial bid request, wherein the third artificial bid request is not indicative of the artificial high value associated with the artificial user;

generating, as part of the process for identifying one or more potential misuses of bid data by the bidder, a fourth artificial bid request requesting bidding for artificial advertisement placement in association with the second artificial user associated with the artificial low value, wherein the fourth artificial bid request comprises the second artificial unique identifier for the second artificial user included in the second artificial bid request but does not comprise at least some of the second legitimate contextual data included in the second artificial bid request, wherein the fourth artificial bid request is not indicative of the artificial low value associated with the second artificial user;

during a second time period, transmitting, as part of the process for identifying one or more potential misuses of bid data by the bidder, the third artificial bid request excluding the legitimate contextual data for the artificial user to the bidder and transmitting the fourth artificial bid request excluding the second legitimate contextual data for the second artificial user to the bidder;

receiving a bid from the bidder in response to the third artificial bid request associated with the artificial user;

receiving a second bid from the bidder in response to the fourth artificial bid request associated with the second artificial user;

responsive to determining that the bid received in response to the third artificial bid request generated to comprise the artificial unique identifier for the artificial user associated with the artificial high value but not comprise at least some of the legitimate contextual data for the artificial user exceeds a threshold amount as compared to the second bid received in response to the fourth artificial bid request generated to comprise the second artificial unique identifier for the second artificial user associated with the artificial low value but not comprise at least some of the second legitimate contextual data for the second artificial user, designating the bid as a potential misuse of bid data;

generating, as part of the process for identifying one or more potential misuses of bid data by the bidder and via a processor-implemented supply-side platform, a third artificial unique identifier that was not previously included in any user profile provided to bidders by the processor-implemented supply-side platform;

generating, as part of the process for identifying one or more potential misuses of bid data by the bidder and via the processor-implemented supply-side platform, a fifth artificial bid request requesting bidding for artificial advertisement placement in association with a third artificial user, wherein generating the fifth artificial bid request comprises including, in the fifth artificial bid request being generated, the third artificial unique identifier and segment data indicating that the third artificial user has an interest in at least one of particular subject matter or a particular geographical location;

transmitting, as part of the process for identifying one or more potential misuses of bid data by the bidder and via the processor-implemented supply-side platform, the fifth artificial bid request including the segment data indicating that the third artificial user has an interest in at least one of the particular subject matter or the particular geographical location to the bidder during a fifth time period;

generating, as part of the process for identifying one or more potential misuses of bid data by the bidder and via the processor-implemented supply-side platform, a sixth artificial bid request requesting bidding for artificial advertisement placement in association with the third artificial user, wherein generating the sixth artificial bid request comprises including, in the sixth artificial bid request being generated, the third artificial unique identifier included in the fifth artificial bid request while excluding, from the sixth artificial bid request being generated, at least some of the segment data indicating that the third artificial user has an interest in at least one of the particular subject matter or the particular geographical location;

transmitting, as part of the process for identifying one or more potential misuses of bid data by the bidder and via the processor-implemented supply-side platform, the sixth artificial bid request excluding at least some of the segment data indicating that the third artificial user has an interest in at least one of the particular subject matter or the particular geographical location to the bidder during a sixth time period after the fifth time period;

receiving, via the processor-implemented supply-side platform, one or more third bids in response to the sixth artificial bid request;

declaring, via the processor-implemented supply-side platform, the bidder to be the winner associated with the sixth artificial bid request regardless of one or more prices associated with the one or more third bids; and examining, via the processor-implemented supply-side platform, content of one or more advertisements associated with winning the sixth artificial bid request and determining whether the content of the one or more advertisements matches at least some of the segment data indicating that the third artificial user has an interest in at least one of the particular subject matter or the particular geographical location and included in the fifth artificial bid request.

8. The computer-implemented system of claim 7, wherein the particular geographical location comprises latitude-longitude coordinates.

9. The computer-implemented system of claim 7, wherein the operations comprise providing a notification based upon the designating.

10. The computer-implemented system of claim 7, comprising determining that the bidder misused the legitimate contextual data based upon the determination that the bid received in response to the third artificial bid request exceeds the threshold.

11. The computer-implemented system of claim 9, wherein the notification is indicative of a number of instances in which potential data misuse was detected.

12. The computer-implemented system of claim 9, wherein the notification is indicative of one or more specific bids placed associated with potential data misuse.

13. A computer-implemented method for facilitating detection of bid data misuse, the method comprising:

receiving, from an advertiser, a desired audience for a campaign;

determining to provide artificial bid requests, for the campaign, for different value user types including both (i) a high-value user type associated with a higher likelihood of clicking on or converting an advertisement of the campaign and (ii) a low-value user type associated with a lower likelihood of clicking on or converting an advertisement of the campaign;

modeling an artificial user of the high-value user type based upon the desired audience for the campaign;

modeling a second artificial user of the low-value user type based upon the desired audience for the campaign;

generating, as part of a process for identifying one or more potential misuses of bid data by a bidder and via a processor-implemented supply-side platform, a first artificial user profile for the artificial user of the high-value user type, wherein the first artificial user profile is generated by combining an artificial unique identifier for the artificial user with legitimate contextual data associated with a legitimate user such that artificial bid data of the first artificial user profile appears as new to bidders based upon the artificial unique identifier;

generating, as part of a process for identifying one or more potential misuses of bid data by the bidder and via the processor-implemented supply-side platform, a first artificial bid request requesting bidding for artificial advertisement placement in association with the artificial user, wherein generating the first artificial bid request comprises including, in the first artificial bid request being generated, the artificial unique identifier for the artificial user and the legitimate contextual data associated with the legitimate user, wherein the first artificial bid request is indicative of a level of value associated with the artificial user based upon the legitimate contextual data;

during a first time period, transmitting, as part of the process for identifying one or more potential misuses of bid data by the bidder and via the processor-implemented supply-side platform, the first artificial bid request indicative of the level of value associated with the artificial user to the bidder;

generating, as part of the process for identifying one or more potential misuses of bid data by the bidder and via the processor-implemented supply-side platform, a second artificial bid request requesting bidding for artificial advertisement placement in association with the artificial user, wherein generating the second artificial bid request comprises including, in the second artificial bid request being generated, the artificial unique identifier included in the first artificial bid request, wherein the second artificial bid request is not indicative of the level of value associated with the artificial user;

during a second time period, transmitting, as part of the process for identifying one or more potential misuses of bid data by the bidder and via the processor-implemented supply-side platform, the second artificial bid request not indicative of the level of value associated with the artificial user to the bidder;

receiving a bid amount from the bidder in response to the second artificial bid request;

determining that the bid amount received in response to the second artificial bid request generated to include the artificial unique identifier for the artificial user but is not indicative of the level of value associated with the artificial user exceeds a threshold;

providing a notification of the bid amount exceeding the threshold;

generating, as part of the process for identifying one or more potential misuses of bid data by the bidder and via the processor-implemented supply-side platform, a third artificial unique identifier that was not previously included in any user profile provided to bidders by the processor-implemented supply-side platform;

generating, as part of the process for identifying one or more potential misuses of bid data by the bidder and via the processor-implemented supply-side platform, a fifth artificial bid request requesting bidding for artificial advertisement placement in association with a third artificial user, wherein generating the fifth artificial bid request comprises including, in the fifth artificial bid request being generated, the third artificial unique identifier and segment data indicating that the third artificial user has an interest in at least one of particular subject matter or a particular geographical location;

transmitting, as part of the process for identifying one or more potential misuses of bid data by the bidder and via the processor-implemented supply-side platform, the fifth artificial bid request including the segment data indicating that the third artificial user has an interest in at least one of the particular subject matter or the particular geographical location to the bidder during a fifth time period;

generating, as part of the process for identifying one or more potential misuses of bid data by the bidder and via the processor-implemented supply-side platform, a sixth artificial bid request requesting bidding for artificial advertisement placement in association with the third artificial user, wherein generating the sixth artificial bid request comprises including, in the sixth artificial bid request being generated, the third artificial unique identifier included in the fifth artificial bid request while excluding, from the sixth artificial bid request being generated, at least some of the segment data indicating that the third artificial user has an interest in at least one of the particular subject matter or the particular geographical location;

transmitting, as part of the process for identifying one or more potential misuses of bid data by the bidder and via the processor-implemented supply-side platform, the sixth artificial bid request excluding at least some of the segment data indicating that the third artificial user has an interest in at least one of the particular subject matter or the particular geographical location to the bidder during a sixth time period after the fifth time period;

receiving, via the processor-implemented supply-side platform, one or more third bids in response to the sixth artificial bid request;

declaring, via the processor-implemented supply-side platform, the bidder to be the winner associated with the sixth artificial bid request regardless of one or more prices associated with the one or more third bids; and examining, via the processor-implemented supply-side platform, content of one or more advertisements associated with winning the sixth artificial bid request and determining whether the content of the one or more advertisements matches at least some of the segment data indicating that the third artificial user has an interest in at least one of the particular subject matter or the particular geographical location and included in the fifth artificial bid request.

14. The computer-implemented method of claim 13, wherein the second artificial bid request comprises a reduced amount of the legitimate contextual data.

15. The computer-implemented method of claim 14, wherein determining that the bid amount exceeds the threshold is based upon the bid amount being greater than a second bid amount placed in response to another bid request associated with contextual data similar to the reduced amount of the legitimate contextual data.

16. The computer-implemented method of claim 15, wherein the another bid request comprises a third artificial bid request having second legitimate contextual data similar to the reduced amount of the legitimate contextual data.

17. The computer-implemented method of claim 13, wherein the second artificial bid request comprises a reduced amount of the legitimate contextual data.

18. The computer-implemented method of claim 17, wherein the reduced amount of the legitimate contextual data does not comprise some of the legitimate contextual data.

19. The computer-implemented method of claim 18, wherein determining that the bid amount exceeds the threshold is based upon the bid amount being greater than a second bid amount placed in response to a third artificial bid request associated with a second artificial unique identifier but not a second legitimate contextual data.

20. The computer-implemented method of claim 13, wherein the particular geographical location comprises latitude-longitude coordinates.

* * * * *